United States Patent
Polcyn

(10) Patent No.: US 6,173,437 B1
(45) Date of Patent: Jan. 9, 2001

(54) MULTIMEDIA SCRIPTING TOOL

(75) Inventor: Michael J. Polcyn, Allen, TX (US)

(73) Assignee: InterVoice Limited Partnership, Reno, NV (US)

( * ) Notice: Under 35 U.S.C. 154(b), the term of this patent shall be extended for 0 days.

(21) Appl. No.: 08/900,237

(22) Filed: Jul. 24, 1997

(51) Int. Cl.$^7$ ................................................. G06F 9/45
(52) U.S. Cl. ................ 717/1; 717/5; 717/7; 704/270; 345/348; 345/967; 379/908
(58) Field of Search ................... 717/1, 5, 7, 2; 345/967, 339, 348; 704/270; 379/908, 915

(56) References Cited

U.S. PATENT DOCUMENTS

| 5,083,262 | * | 1/1992 | Haff, Jr. ................... | 395/500 |
| 5,243,643 | * | 9/1993 | Sattar et al. ............... | 379/88 |
| 5,487,169 | * | 1/1996 | Vraney et al. ............. | 395/707 |
| 5,854,927 | * | 12/1998 | Gelissen .................. | 395/705 |
| 5,867,712 | * | 2/1999 | Shaw et al. ................ | 717/4 |
| 5,913,195 | * | 6/1999 | Weeren et al. ............. | 704/270 |
| 5,946,485 | * | 8/1999 | Weeren et al. ............. | 395/703 |
| 6,002,868 | * | 12/1999 | Jenkins et al. ............ | 395/701 |

OTHER PUBLICATIONS

Richard Grigonis, "10 APP GENs Reviewed," Computer Telephony, Jun. 1997, pp. 82, PROMT Database (pp. 1–8).*

Computer Telephony, "Expert Systems", Jun. 1997, pp. 100, PROMT Database (pp. 1).*

Paul Resnick, "Phone–Based CSCW: Tools and Trials," ACM Transactions on Information Systems, vol. 11, Issue 4 (1993), pp. 401–424.*

* cited by examiner

Primary Examiner—Kakali Chaki
Assistant Examiner—Tuan Q. Dam
(74) Attorney, Agent, or Firm—Fulbright & Jaworski L.L.P.

(57) ABSTRACT

The disclosed invention provides a development environment for scripting a call flow across a variety of hardware devices. The development environment utilizes a single scripting language in conjunction with hardware specific compiler modules to generate code operable on the different hardware devices. Such use of a single scripting language to generate code for a complete call flow, regardless of the hardware devices it must ultimately utilize, provides for advantages in ease of development as well as ease and efficiency of use.

47 Claims, 2 Drawing Sheets

MULTIMEDIA SCRIPTING TOOL

RELATED APPLICATIONS

Reference is hereby made to the following commonly assigned U.S. patent application: ENHANCED GRAPHICAL DEVELOPMENT ENVIRONMENT FOR CONTROLLING PROGRAM FLOW, Ser. No. 08/599,134, now U.S. Pat. No. 5,946,485, the disclosure of which application is incorporated herein by reference.

TECHNICAL FIELD OF THE INVENTION

This invention relates in general to telephone communications systems and more particularly to a computer-based application development environment that supports device-independent call flow scripting.

BACKGROUND OF THE INVENTION

In today's society, it is quite common for a person to call a business, such as a bank, and reach an interactive voice response (IVR) system. Typically, such an IVR system prompts the caller to enter certain information, such as an account number and personal identification number (PIN). The IVR system may then check this information against a database and, depending on information stored within the database, may provide relevant information or may prompt the caller to select an available transaction.

For example, after entering valid account and PIN numbers, as verified through comparison with a database, a caller may indicate that he or she wishes to determine the balance of a savings account. Once the caller indicates this choice, the IVR will retrieve the information from the proper database and communicate it to the caller.

After completing a transaction, the caller is typically prompted for a follow up option. Such follow up options might include the choice of speaking to an account representative. Upon selection of this option, the caller will eventually be connected with an account representative, possibly through an automatic call distribution (ACD) system coupled to the IVR system.

Typically, service of the caller by the account representative requires some of the same information previously provided the IVR and/or its coupled devices by the caller. For example, the account representative might require the caller's name, PIN, and account number. Accordingly, the caller is forced to resupply the information that was previously input to the IVR system. This repetition causes unnecessary delay to the parties involved as well as increasing the possibility of an error in the communication of such information.

In typical prior art IVR systems there are technical reasons that the caller must resupply previously entered information at subsequent points in the call flow. Generally, the hardware that manages incoming calls is divided into a number of discrete components connected via communications links. Each component operates substantially independent of the others to perform a specific function. For example, a private branch exchange (PBX) may initially route the incoming call to the IVR system which in turn sends database queries to a database server in response to caller input. When the caller indicates that he or she wants to speak to an account representative, the PBX, possibly in conjunction with an ACD, routes the call to a telephone used by the account representative and to a computer-telephony integrated (CTI) server controlling the account representative's computer terminal.

Generally, each component is controlled by its own call flow script to result in essentially a state machine that transitions according to the caller's input. A call flow script must be written and compiled for each such component since each component possesses different capabilities and features to perform the various aspects of a call flow.

Accordingly, each component involved in handling a call acts as its own "island." Since each component requires its own call flow script, there are few, if any, provisions for passing data among the components. Since each component is independent, short of a single high level device controlling each component, there is no uniform way to pass variable data, such as an account number, among the various autonomous components. As a result, both the caller and callee are inconvenienced when the caller is forced to enter redundant information into IVR systems and the like.

The use of the above described autonomous components to achieve a desired call flow, although presenting a limitation to passing data among the components, has advantages associated with a distributed system. By distributed system it is meant that separate components are responsible for specific functions.

An advantage presented by a distributed system includes system fault tolerance, i.e., if a single component fails only its functionality is compromised and additional aspects of the call handling system remain available to service a caller. Where a single device is utilized to provide, or a single high level device is utilized to control, all aspects of a call flow, the failure of such a device renders the system totally inoperable. Additionally, unrelated or dissimilar components, i.e., produced by different manufacturers or from differing model lines, may be interconnected to provide the desired aspects of a call flow. For example, features not available on one manufacturer's equipment or model line may be realized through the use of another manufacturer's equipment including the feature.

Thus, there is a need in the art for the ability to pass data among various components used to control a telephone call.

There is a further need in the art for the ability to interconnect dissimilar components to comprise the various components used to control a telephone call while maintaining the ability to pass data among them.

There is also a need for a scripting language that can be used to script the call flows of the various components.

More specifically, there is a need in the art for a development environment that can be used in a device-independent manner to script a call flow from start to finish.

There is a still further need in the art for the development environment to consider attributes of the various components in order optimize their interaction in the call flow.

SUMMARY OF THE INVENTION

The above and other needs are met by a development environment having a device independent scripting language that can be used in controlling all of the hardware involved in handling an incoming phone call. The scripting language allows the call flow to be scripted from a starting boundary, i.e., off hook, incoming to the PBX, incoming to the building, etc., to an end point such as call termination. Call flow scripting through the use of the scripting language involves the use of a single high level command structure, regardless of the different individual hardware components actually handling the call, to generate code operable on the individual components.

The scripting language allows the developer to script all possible aspects of the call, such as messages, prompts, menu choices, and presentation of variable information. The developer can use a single variable set, common throughout the different hardware components, to control the call flow.

In order to provide code operable on the different hardware components, the development environment contains a plurality of sub-compilers, or hardware specific modules, to compile a run-time version of the script for each discrete hardware component, or "box," on which the script will run. In other words, the developer informs the development environment as to what specific hardware will be used, and the development environment determines how various portions of the script, or script segments, should be compiled in order to provide the desired call flow on the available hardware.

Typically, each hardware component supports a defined, or standard, feature set. However, certain features are often configurable. Therefore, the development environment will determine the optimal hardware configuration of each discrete hardware component to result in their improved interaction throughout the call flow. Additionally, as certain call flow characteristics may be more important in a particular installation than others, the development environment utilizes developer input selecting desired attributes to determine the optimal hardware configuration. For example, the speed at which variable information is retrieved or passed between the various hardware components may be of paramount importance in a given installation, even at the expense of other system attributes, such as signal quality or the like. Here, the developer will indicate such, through the use of configuration information, to the development environment resulting in communication parameters being adjusted in the various script segments, for example.

Similarly, as the development environment includes information regarding the features available from the different hardware components, the development environment is able to inform the developer if a particular feature, necessary to complete a particular call flow, is not available. Utilizing the information regarding the available features, the development environment may determine that an unavailable feature's function may be emulated through the use of other features or devices. The inclusion of feature emulation in the script may be automatic, or may be presented for developer selection. For example, working in conjunction with configuration criteria input, the development environment may present the developer with the option to include feature emulation at the expense of a particular configuration criteria.

A technical advantage of the present invention is real-time sharing of all call flow data among the various hardware components handling different aspects of the call flow. It shall be appreciated that real-time data sharing is especially useful in the CTI arena, as it allows all information previously input by a caller as well as any associated data, such as retrieved variable information, to be viewed on a service agent's computer monitor contemporaneously with the transfer of the call to that agent's telephone.

A corresponding technical advantage of the present invention is a more efficient call flow. Since data is shared among components, a caller is not required to redundantly enter data nor is the system required to redundantly retrieve data. Moreover, the call flow can be routed more efficiently since the data is always available for determination of call flow branching at various points.

Another technical advantage of the present invention is increased script development speed. A single, unified, scripting language decreases the burden on the developer and increases the rate at which the call flow may by scripted.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

The present invention provides a device independent scripting language that can be used to generate code to control all of the hardware involved in handling a phone call, or other information communication link, through a structured call flow. The scripting language of the present invention allows the call flow to be scripted from a call flow starting boundary to a call flow end point irrespective of the various hardware components required to service the particular attributes of the call flow. This allows the developer to use a single development tool to script all possible aspects of the call, such as menu choices etc. Additionally, the present invention allows the developer to use a single, or common, variable set throughout the call flow to enable sharing information between the various component of the call handling system.

Figure 1:
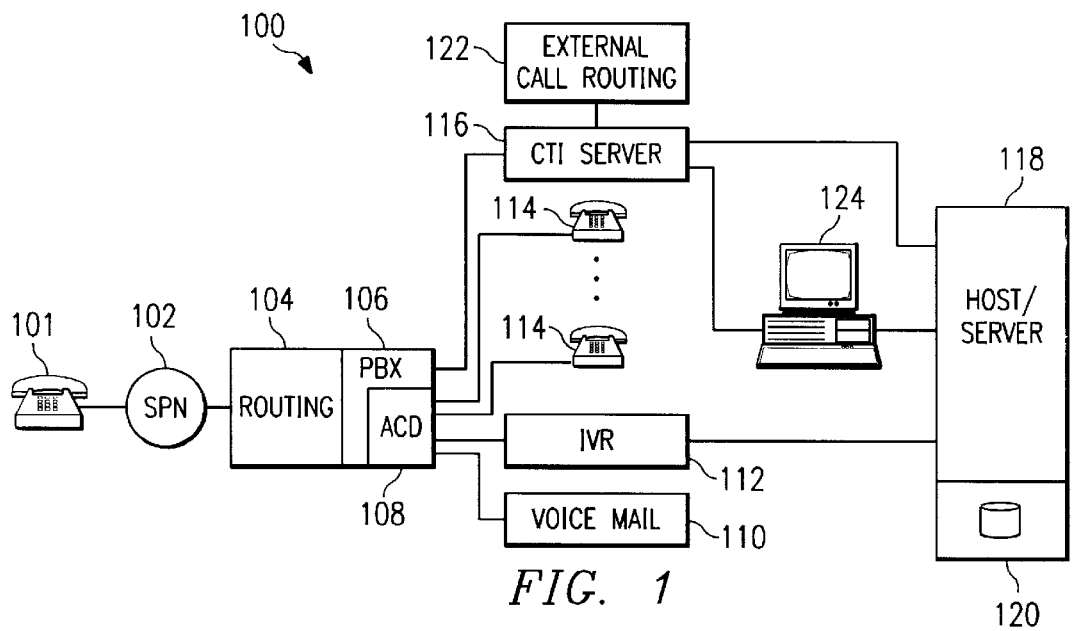
FIG. 1 illustrates the various hardware components typically utilized to comprise an interactive call handling system.

Directing attention to FIG. 1, various hardware components typically used to route a telephone call from a caller to a business or other entity, or vice versa, are illustrated as interactive call handling system 100. Shown are telephone handset 101 coupled to subscriber public network (SPN) 102. SPN 102, in turn, is coupled to PBX 106. In order to conduct various calling features, PBX 106 may have associated therewith routing logic 104, ACD logic 108, or other call handling feature logic. Of course, this logic may be an integral part of PBX 106 as illustrated in FIG. 1, or may be discrete components coupled thereto.

ACD logic 108 is coupled to call handling devices such as the exemplary devices, voice mail 110, IVR unit 112, and telephones 114, illustrated in FIG. 1. PBX 106 is also coupled to CTI server 116. IVR unit 112 is coupled to host/server unit 118, which contains database 120. CTI server 116 is coupled to external call routing logic 122, host/server unit 118, and workstation 124. Workstation 124 is also coupled to host/server unit 118.

Telephone 101 may be, for example, a standard telephone handset including a numeric keypad. Alternatively, telephone 101 could be a modem, fax unit, video telephone, or any other device capable of initiating and maintaining an information communication connection.

SPN 102 is typically part of a public switched telephone network (PSTN) as is well known in the art. In addition, SPN 102 may support enhanced calling services such as automatic number identification (ANI), which provides a callee with information pertaining to the caller. Of course, SPN 102 is not limited to a public network and may in fact be a private information communication network, if desired.

To aid in the understanding of a call flow according to a script generated by the present invention, reference shall be made to an exemplary call situation wherein a customer calls a banking institution. It shall be understood, however, that the present invention is suitable for use in developing call flow scripts for any number of different situations and uses.

In the banking example, a customer may call the bank in order to transact certain business over the phone. Upon establishing a link with the bank via telephone 101 and SPN 102, routing logic 104 of PBX 106 receives the incoming call from SPN 102 and, according to its script, may forward the call to ACD 108. ACD 108, following its own script, may in turn initially forward the call to IVR 112. The IVR interacts with the caller according to its own predefined script. By using the telephone keypad, uttering predetermined words, or the like, the caller is able to choose from call flow branching options presented by IVR 112.

For example, the caller may be prompted by IVR 112 to input certain identifying information such as entering an account identification number. Thereafter, IVR 112 may verify the account identification number by comparing the caller input information with data stored in database 120 of host/server unit 118.

Upon verification of the account identification number, the caller may be presented with call flow branching choices by IVR 112. Such choices may include reviewing an account balance, transferring funds between accounts, or verifying posting of a deposit. In response to such a choice, the caller may again input information identifying a desired selection. Thereafter, IVR 112 and host/server 118 cooperate through PBX 106 to retrieve/manipulate the appropriate data stored within database 120. It shall be appreciated that certain information previously input by the caller, such as the aforementioned account identification number, may be utilized by host/server 118 in retrieving/manipulating the data.

In addition to the above mentioned data retrieval/manipulation choices, the caller may also be presented with the option of leaving a voice mail message. In such a case, the IVR 112 and ACD 108 cooperate to redirect the call to voice mail 110. Voice mail 110 executes its own script that prompts the caller to leave a message. Here again, certain information previously input by the caller, or other information such as ANI information, may be advantageously stored by voice mail 110 to aid the recipient of the caller's message in servicing the caller.

Moreover, typically at any point after the call is received by PBX 106, the caller may speak with a live operation by pressing a predefined key, such as "0." Likewise, ACD 108 will generally transfer the caller to an operator if the caller is communicating via a device incapable of providing suitable responses; for example where a rotary telephone is used in a system expecting dual tone multiple frequency (DTMF) signals. In either case, ACD 108 transfers the call to a particular telephone within telephone bank 114. In addition, ACD 108 transfers information determined by IVR 112, such as the account identification number, to CTI server 116. CTI server 116 presents the information on workstation 124 where it is visible to an operator who received the call on telephone 114. Note that workstation 124 is also coupled to host/server 118 and, therefore, database 120. Accordingly, the operation can use workstation 124 to retrieve and update information in database 120.

From the above example it can be appreciated that interaction of the various hardware components of system 100 to provide a structured call flow typically requires the provision of information between the hardware components. However, where the hardware components are not configured to accept information as previously input or determined, redundant information input/retrieval is necessitated in order to complete a call flow. Therefore, the present invention provides a technique by which a call flow script developer may easily and homogeneously develop a script defining a structured call flow across all the hardware components of system 100.

Figure 2:
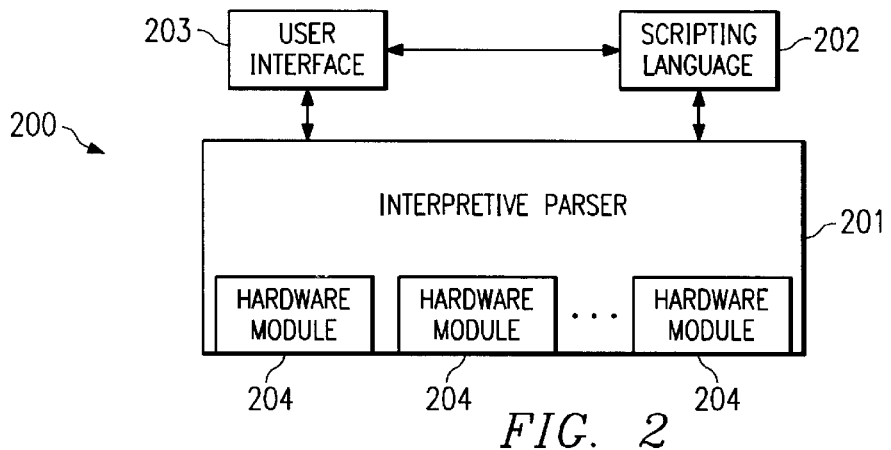
FIG. 2 illustrates a block diagram depicting the various modules of a preferred embodiment of the development environment of the present invention.

To provide the desired call flow across the various hardware components forming interactive call handling system 100 according to the present invention, a developer uses a development environment having a universal scripting language cooperating with hardware specific modules to provide call flow code. Directing attention to FIG. 2, a block diagram depicting the various modules of a preferred embodiment of the development environment is shown. It shall be appreciated that development environment 200 is an algorithm which is operable upon any number of processor-based systems providing a suitable user interface and sufficient processing capability. For example, workstation 124 illustrated in FIG. 1 may be suitable for a developer's use of development environment 200.

User interface 203 of development environment 200 provides a user friendly interface between a user (i.e., call flow developer) and the functions of development environment 200. This interface may provide any form of user/system interaction well known in the art, such as textual, graphical, or audio as well as any combination thereof. Preferably, user interface 203 presents a substantially graphical interactive interface such as is common with MICROSOFT WINDOWS type computer applications. A system utilizing a graphical user interface to aid in the development of a VRU application is disclosed in U.S. patent application Ser. No. 08/599,134, entitled "ENHANCED GRAPHICAL DEVELOPMENT ENVIRONMENT FOR CONTROLLING PROGRAM FLOW," having a common assignee, previously incorporated herein by reference.

Through user interface 203, a user is able to indicate to the development environment a desired call flow by constructing a call flow script from select portions of the scripting language, such as through the use of icons or structured commands, and identifying their interrelationship. Through this interrelationship of icons/commands, the scripting language allows the developer to script all possible aspects of the call, such as messages, prompts, menu choices, and presentation of variable information. The developer can use a single variable set, common throughout the different hardware components, to control the call flow. User interface 203 also provides means by which development environment 200 may present information, such as choices, error conditions, and features available with call flow system 100, to a user.

Scripting language 202 contains all of the call flow system code constructs, such as subroutines and functions, necessary to control the telephone call from the time the handset goes off-hook until the call is terminated. For example, the scripting language can provide for supplying a dial tone to the handset, routing the call after dialing, and controlling the call once it is connected with its destination. These code constructs, although actually instigating a series of hardware functions, may be represented by a single, or otherwise reduced number of, scripting language icons/commands. For example, a single scripting language icon identified as "record message" may in fact involve placing a call on hold, verifying that the desired voice mailbox is available to record the message, and recording the message on the desired voice mailbox if available.

In addition to the above mentioned system wide constructs, the scripting language also contains constructs operable to perform desired functions/features within each particular hardware component of call flow system 100. For example, the scripting language includes code constructs for scripting the call flow of IVR unit 112, in the event a call should be routed there. Likewise, the scripting language includes code constructs to enable CTI server 116 to manipulate data stored on host/server 118 in the event such data manipulation is desired in a call flow.

However, as each hardware component, such as PBX 106, voice mail 110, IVR 112, and CTI server 116, provide a unique set of functions/features, a call flow script constructed with scripting language 203 must be broken down into component parts, or script segments, wherein call flow parts requiring particular features are directable to particular hardware components providing those features. Therefore, development environment 200 includes interpretive parser 201.

Parser 201 operates to subdivide, or parse, the unitary call flow script constructed by the user into script segments appropriate for execution on particular hardware devices. Such call flow script parsing may involve the division of portions of particular code constructs between several hardware components. For example, in the example given above for the scripting language command "record message" placing a call on hold involves a function available from PBX 106, whereas verifying that the desired voice mailbox is available to record the message involves a function available from ACD 108 and, likewise, recording the message on the desired voice mailbox involves a function available from voice mail 110.

As each hardware component, such as voice mail 110, IVR 112, and CTI server 116 include their own unique set of functions/features as well as an associated unique instruction set, parser 201 cooperates with hardware modules 204 to determine the functions/features available from particular hardware components, and their associated instruction sets. It shall be understood that hardware modules 204 include information sets containing information specific to each hardware component of call flow system 100. These modules may be an integral part of development environment 200 where, for example, a user simply indicates which modules of a library of such modules correspond to the hardware components being utilized in a particular call flow system. Alternatively, these modules may in fact be discrete data sets interfaceable with development environment 200 as required for scripting a call flow for a particular call handling system.

Figure 3:
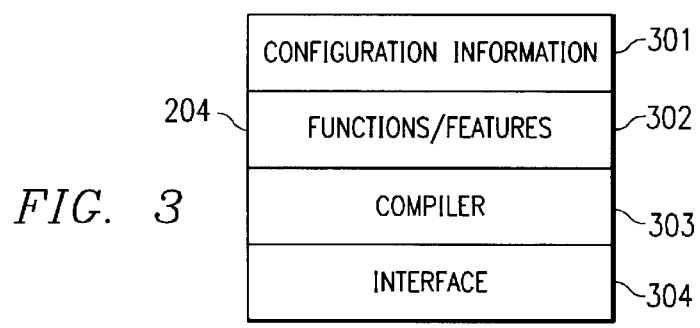
FIG. 3 illustrates a preferred embodiment of a hardware module of the development environment of the present invention.

Regardless of their severability from development environment 200, hardware modules 204 preferably include information relevant to various aspects of each hardware component to be utilized in call handling system 100. Directing attention to FIG. 3, a preferred embodiment of a hardware module can be seen. Here each module is composed of multiple blocks of information relevant to different aspects of its associated hardware component.

Block 301 of the preferred embodiment of a hardware module includes configuration information of the associated hardware components. This information includes information relevant to the implementation, within call handling system 100, of the particular associated hardware component. Such information includes identification of any other hardware components coupled to this hardware component as well as information relevant to their interfacing.

Configuration information may also include such information as the selection of a particular optional configuration of the hardware component. For example, IVR 112 may be configurable to accept voice signals in response to prompts at the expense of slower processing of responses. Where selection processing time is an import consideration, a user may elect to configure IVR 112 to accept only DTMF responses. This configuration selection would preferably be reflected in configuration information block 301 of the hardware module associated with IVR 112.

Additionally, configuration information may include user selected preferences as to the implementation or operation of the associated hardware component. Such information may include, for example, an indication of a preferred communication baud rate, a default operating condition, or a preferred hardware component through which to interact. This information is utilized by parser 201 in parsing the call flow script into the script segments to accommodate the selected preferences where possible.

Likewise, development environment 200 may also allow a user to input system wide, or global, preferences which are also taken into consideration when parsing the call flow script. Such system wide preferences might include a preferred hardware device to perform a particular function where more than one device performs such a function. Similarly, system wide preferences might include desired global attributes such as an indication that call handling speed from inception to termination or signal (i.e., voice sound) quality are to be maintained even at the expense of other system attributes.

Block 302 of the preferred hardware module includes function/feature information relevant to the associated hardware component. This information includes the functions the particular hardware component is capable of performing, including, but not limited to, information with respect to call handling operations and interaction with devices/systems outside of call handling system 100. Additionally, included in this information might be information regarding the features available through the hardware component, although all such features may not be activated in the hardware component's current configuration.

Block 303 includes program compiler information with respect to the associated hardware component. This information may include a complete compiler algorithm operable to properly compile the parsed call flow script segments into code suitable for execution on the particular hardware component to which it is associated. Preferably, however, the compiler information of block 303 includes information as to a compiler capable of providing the proper executable code. This arrangement is preferable as more than one hardware device may utilize a common compiler. Therefore, such a common compiler would not be included within the hardware module of each hardware component, but simply occur once, such as a separate algorithm (not shown) coupled to, or within, parser 201.

Regardless of whether the compiler necessary for a particular hardware component is included within the hardware module or elsewhere, the compiler information of block 303 also includes information necessary to conform, or translate, the parsed call flow script segments, comprised of the commands of the scripting language, to commands compatible with the compiler associated with the particular hardware component where necessary.

Preferably, translation of the parsed call flow script segments is accomplished through the use of a correlation table identifying commands of the scripting language of the present invention to those of the particular hardware component. Of course, the use of such a correlation table could include the utilization of an algorithm to intelligently translate the code, if desired. For example, an algorithm could be used which, prior to simply substituting the hardware component command for a like scripting language command, looks ahead to determine if multiple scripting language commands might be accomplishable by a reduced number of hardware component commands.

It shall be understood that, although call flow script segments are translated into commands compatible with the particular hardware component, certain information from the call flow script remains unchanged by such a process. Specifically, information to be shared amongst the various hardware components, such as a variable identification and format, remain the same throughout all the various translated call flow script segments. This provides a simple means by which common information may be shared between the hardware components as a call is handled according to the defined call flow.

Block 304 of hardware module 204 provides information relevant to development environment 200 interfacing with the particular associated hardware component. This information might include a particular port and communication parameters through which development environment 200 may communicate directly with a particular hardware component. Alternatively, this information might indicate that direct communication between development environment and a particular hardware component is not possible and may instead include methods of indirect communication. Such methods may include the printing of code for direct input into the hardware component by an operator, or the identity of a coupled hardware component, as well as any necessary command set, through which indirect communication may be maintained. Similarly, the interface information may simply indicate a storage media and file structure through the use of which development environment 200 may indirectly transfer the generated code.

Figure 4:
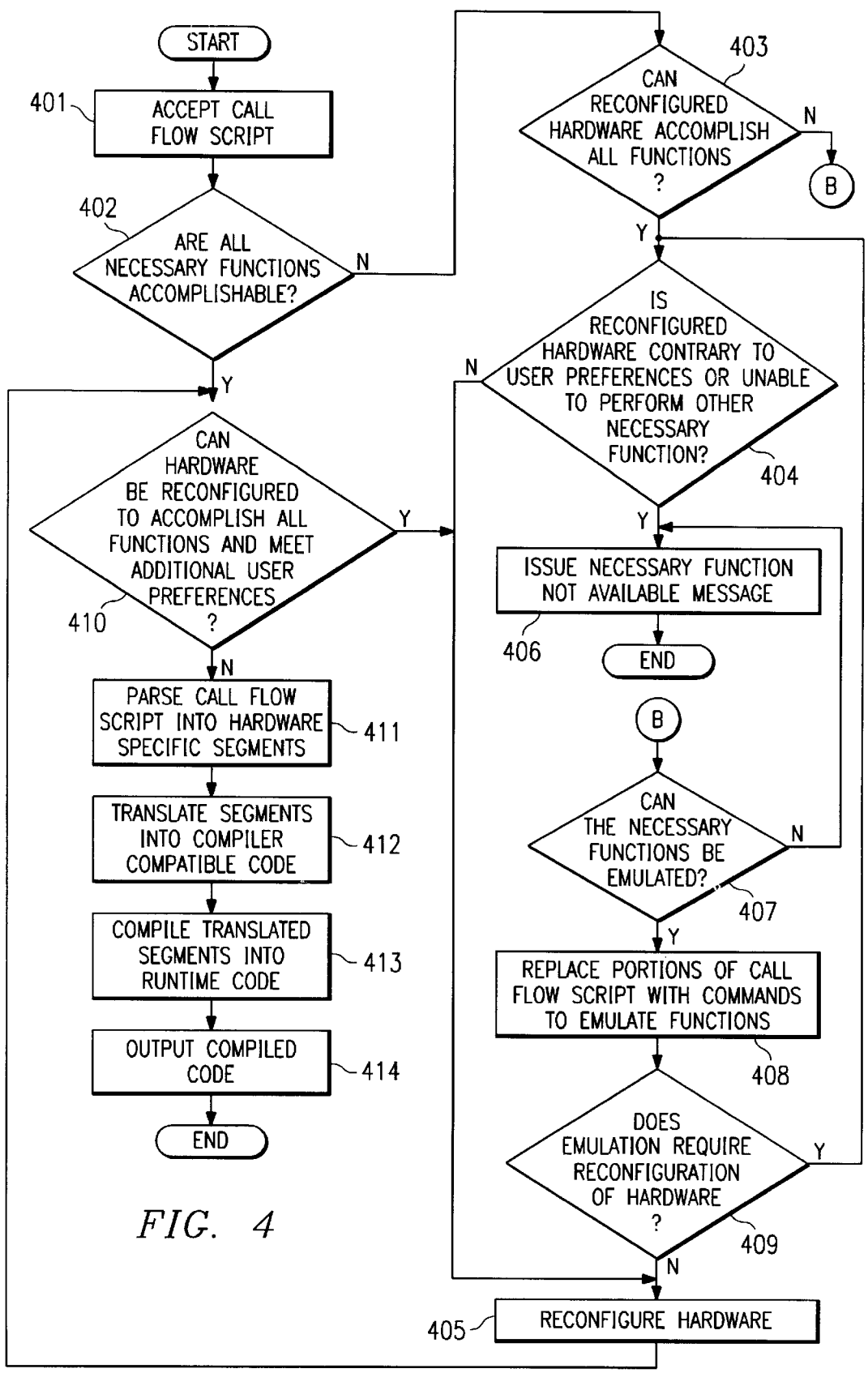
FIG. 4 illustrates the steps of a preferred embodiment of the interpretive parser of the present invention.

Having described the overall functionality of the development environment of the present invention, reference is now made to FIG. 4 illustrating with detail the steps of the interpretive parser of the present invention. At step 401, the parser accepts the call flow script as generated by the user. Such acceptance of the call flow script may be real-time or batch.

Advantages are realized in accepting the call flow script in real-time. Where the call flow script is accepted in real-time, determinations may be made as to the availability of necessary functions to perform the tasks desired by the user. Where such features are not available, a particular scripting language icon/command may be made unavailable or a message may be issued substantially simultaneously with the user's selection of the scripting language icon/command stating that the function is unavailable or requires hardware configuration. As such, considerable time and effort may be saved in developing portions of a call flow script which rely on functions not available on the system.

However, advantages are also realized in acceptance of the call flow script in batch, as parsing of the a batch script is able to take into consideration all functions necessary to accomplish a call flow when parsing a particular segment. Additionally, a parser operating in batch may include intelligent features, such as the ability to look ahead in the script in order to minimize a number of hardware component commands necessary to perform a function, as discussed above. Therefore, the preferred embodiment of the present invention accepts the call flow script in real-time, utilizing determinations such as those discussed in detail below with respect to steps 402, 403, and 407, to aid the user in developing the call flow.

As described above, each hardware component may include not only unique functions/features, but may also provide for various user selected configurations. Similarly, a user might prefer a particular implementation of the hardware components to achieve a desired characteristic, such as reduced call handling time, improved signal quality and the like. Therefore, the parser of the present invention preferably considers each function necessary to accomplish the call flow script in light of the other functions necessary to accomplish the call flow. From these considerations, the parser is able to intelligently parse the call flow script into scripting language segments more able to meet the desires of the user. Specifically, not only is the parser able to create a group of scripting language segments suitable for performing the functions necessary to accomplish the call flow through the hardware devices, but additional user preferences as described above may be met.

Such desired characteristics are often achievable through intelligent parsing of the call flow script to result in the various hardware components cooperating to achieve the desired result. Therefore, preferably parser 201 includes steps beyond those necessary to simply divide the many tasks of the call flow script among the available hardware components. A preferred embodiment of the intelligent parsing steps of parser 201 are illustrated as steps 402–410. These steps operate to consider not only the tasks of the call flow script, but configuration options of each hardware component and user selected preference information to interpretively parse the call flow script amongst the various hardware components.

Step 402 determines if all the functions necessary to complete the call flow script are accomplishable by the various hardware components comprising system 100. This determination is made with reference to the hardware modules discussed above. Specifically, the parser looks to the functions/features and configuration information in its determination as to whether the components, as configured and interconnected, can accomplish all the tasks required to complete all branches of the call flow. This determination may be made by the parser comparing each function associated with the call flow script with the functions hardware devices as configured. Of course, other methods of making this determination may be utilized, if desired.

If it is determined in step 402 that all necessary functions are not available, the parser proceeds to step 403. Step 403 determines if the hardware components may be reconfigured to accomplish all the necessary functions. This determination may be made by simply comparing any functions presently unable to be accomplished with any optional configuration states of the hardware components. However, it shall be appreciated that changing the configuration of a hardware component to facilitate one function may, in turn, cause an inability to accomplish another previously available function. Therefore, preferably step 403 reverifies that all functions may be accomplished with the new configuration, and if not considers other configuration options.

Upon a determination that reconfiguration of hardware components will result in a system that can perform all necessary functions, the parser continues to step 404 to determine if the configuration selected results in a configuration or other attributes contrary to user preferences. This determination is made with reference to configuration information of the hardware module as well as any system wide preferences provided by the user. If these preferences are not satisfied the parser continues to step 406 to issue the proper message to the user. Of course, the parser could continue through multiple iterations of these steps to exhaust other configuration options in an effort to satisfy the user's preferences, if desired.

If it is determined at step 404 that reconfiguration would result in the ability to accomplish all necessary functions as well as satisfaction of the user's preferences, the parser continues to step 405 for reconfiguration of the hardware components. Reconfiguration according to step 405 may include actually causing the particular hardware components to be configured, such as by issuing the proper software commands through a hardware interface. Alternatively, reconfiguration may entail the output of a message informing the user that configuration is necessary, along with an indication of what configuration changes should be made.

If it is determined at step 403 that hardware reconfiguration will not result in all necessary functions being achievable, the parser continues to step 407. At step 407, a determination is made as to whether the necessary functions may be emulated by the available hardware components. If it is determined that necessary features cannot be emulated the parser continues to step 406 to issue the proper message to the user.

Feature emulation may be accomplished through the combining of multiple functions, or portions thereof, of a single hardware component or several hardware components. Preferably, a determination of the ability to emulate a particular function is accomplished through the use of emulation information contained within the parser. For example, a library of functions and various functions which may be utilized to accomplish this same function are stored within the parser. Of course, other methods of making this determination may be utilized, if desired.

If it is determined at step 407 that a necessary function may be emulated, the parser proceeds to step 408 where the portions of the call flow script calling for the function to be emulated are replaced with scripting language reflecting the functions necessary for the emulation. Thereafter, at step 409, it is determined if feature emulation requires reconfiguration of hardware components. If hardware configuration is required, then the parser proceeds to step 404 and continues as described above.

Upon a determination that all necessary functions may be accomplished at step 402 or, similarly, where reconfiguration or emulation provides the same conclusion (steps 405 and 409 respectively), a determination is made as to whether the necessary functions may be accomplished in a manner so as to improve, or optimize, overall system performance. Such a determination is preferably made by the parser analyzing all available configuration combinations which provide all necessary functions, and comparing the configuration to the user preferences or other information indicating a desired system configuration. It shall be appreciated that a configuration where all necessary functions are accomplishable and a maximum number of desirable system parameters are met results in a call flow providing optimize utilization of the various hardware components of the system. Therefore, where such a configuration is determined, the parser proceeds to step 405 to reconfigure the hardware, returning again to step 410 to consider additional configurations.

When all configuration options are exhausted, or no configuration option results in improved utilization of the hardware components, the parser proceeds to step 411 to actually parse the call flow script. Of course, where the above described features of hardware reconfiguration and/or feature emulation are not desired, the above described steps prior to the parser proceeding to parsing step 411 may be eliminated.

The call flow script parsing of step 411 results in portions of the call flow script, or script segments, being bined, or identified with particular hardware components. Bining is accomplished with reference to the configuration and feature/function information of each hardware component. Specifically, the parser determines which of the various portions of the script are accomplishable by which of the hardware components and bins the script segments accordingly. As such, the unitary call flow script input by the user is subdivided into a plurality of script segments each being identified with a particular hardware component capable of accomplishing the functions required by the associated script segment.

Once the call flow script has been parsed into script segments, the parser proceeds to step 412 wherein the universal icons/commands of the scripting language are translated into commands or code compatible with a compiler associated with each hardware component. As discussed above, translation of the parsed call flow script segments is accomplishable through the use of a correlation table identifying commands of the scripting language of the present invention to those of the particular hardware component. Preferably, such correlation table information is included in the compiler block of the above described hardware modules. Of course, where a particular hardware component, or hardware component compiler, may directly utilize the commands of the scripting language, the translation of step 412 may be omitted.

In addition to the translation of commands, as described above, an algorithm may be used in conjunction with such a correlation table to intelligently translate the code, if desired. For example, an algorithm could be used which, prior to simply substituting the hardware component command for a like scripting language command, looks ahead to determine if multiple scripting language commands might be accomplishable by a reduced number of hardware component commands.

It shall be understood that, although call flow script segments are translated into commands compatible with the particular hardware component, certain information from the call flow script remains constant throughout the various translated script segments by such a process. Specifically, information to be shared amongst the various hardware components, such a variable identification and format, remain constant throughout all the various translated call flow script segments. Furthermore, the translation process is operable to provide the proper coding to enable the sharing of this common information between the various hardware components. For example, where information is to be passed between the IVR and CTI server code is provided in the IVR script for supplying the information and, likewise, code is provided in the CTI script for accepting the information. This provides a simple means by which common information may be shared between the hardware components as a call is handled according to the defined call flow, and thus provides for real-time sharing of all call flow data. This is especially useful in the CTI arena because it allows all of the information, whether supplied by the caller or retrieved/manipulated by the call flow system, to be viewed at the monitor associated with an agent ultimately handling the call.

Once the script segments have been translated the parser proceeds to step 413 wherein the translated script segments are complied to a runtime version of the script for each discrete hardware component on which the script will run. Compiling of the script may be performed by compilers incorporated within the parser, such as may be included in the compiler block of the hardware modules, or may be performed by independent compilers in information communication with the present invention.

At step 414, the parser outputs the compiled code for each hardware component. This output may be directly coupled to the hardware components, such as through a hardware interface of the host system upon which the development environment is operating, as indicated in the interface block of the hardware module. Alternatively, this output may be indirectly coupled to the hardware components, such as through another device, i.e., a modem, or output to an intermediate medium, such as disk or hard copy, to be input into the hardware component at a later time.

Although the present invention and its advantages have been described in detail, it should be understood that various changes, substitutions and alterations can be made herein without departing from the spirit and scope of the invention as defined by the appended claims.

What is claimed is:

1. A system for developing a user definable application including at least two application portions each operable on a different device of a plurality of interconnected discrete devices, said system comprising:
   a high level instruction set having a plurality of instructions representing operations performable by said application;
   means for selecting ones of said plurality of instructions and specifying said selected instructions' interaction so as to define said application; and
   means for apportioning said selected ones of said instructions so as to identify particular selected instructions with a particular device of said plurality of interconnected devices suitable for performing an operation associated with said apportioned instruction.

2. The system of claim 1, wherein specifying interaction of said selected instructions comprises identifying a common set of variables to be utilized throughout said at least two application portions.

3. The system of claim 1, further comprising:
   means for adapting instructions of said apportioned instructions specifically for use with said particular device.

4. The system of claim 3, further comprising:
   means for compiling said adapted instructions wherein said compiled instructions are executable on said particular device.

5. The system of claim 4, further comprising:
   means for outputting said compiled instructions to said particular device.

6. The system of claim 1, further comprising:
   a graphical user interface including graphical icons representing said instructions wherein said graphical icons are manipulable by a user to create a program flow path interconnected with at least one arrow.

7. The system of claim 1, further comprising:
   means for providing said apportioning means with a user preference regarding operation of ones of said devices, said apportioning means utilizing said user preference when apportioning said instructions.

8. The system of claim 1, further comprising:
   means for providing said apportioning means with device operation information to be utilized by said apportioning means when apportioning said instructions.

9. The system of claim 8, further comprising:
   means for determining if operations of said application are unaccomplishable by said devices.

10. The system of claim 9, further comprising:
    means for informing a user of said operations determined to be unaccomplishable.

11. The system of claim 9, further comprising:
    means for determining if said unaccomplishable operations may be emulated.

12. The system of claim 9, further comprising:
    means for providing said apportioning means with configuration options of ones of said devices.

13. The system of claim 12, further comprising:
    means for determining if ones of said devices may be reconfigured to accomplish said unaccomplishable operations.

14. A computer program product having a computer readable medium on which computer program logic is recorded for developing a call handling system application, wherein said call handling system includes various dissimilar components interacting to handle a call from a call flow starting boundary to a call flow end point and said application is comprised of a plurality of application segments operable on said dissimilar components, said computer program product comprising:
    a computer readable storage medium;
    a computer program stored in said storage medium comprising:
       a universal scripting language having a plurality of commands representing call handling functions of said call handling system;
       means for representing a complete call handling system application as an arrangement of ones of said plurality of commands; and
       means for parsing said arrangement of commands to result in a plurality of application segments each being associated with a particular component of said various components.

15. The computer program product of claim 14, further comprising:
    means for identifying a global variable set to be used throughout said call handling system application.

16. The computer program product of claim 15, wherein said representing means includes means for specifying interaction between commands of said arrangement of commands, said specified interaction including reference to said global variable set.

17. The computer program product of claim 14, further comprising:

means for translating commands of said arrangement of commands into commands suitable for use with a particular component of said various components.

18. The computer program product of claim 17, further comprising:
means for compiling said translated commands into code executable on said particular component.

19. The computer program product of claim 18, further comprising:
means for outputting said executable code to said particular component.

20. The computer program product of claim 14, wherein said commands are presented to a user as graphical icons and said representing means presents said arrangement of commands as a icons interconnected with at least one arrow representing a call flow path.

21. The computer program product of claim 14, further comprising:
means for providing said parsing means with information regarding a user's preferences as to operation of said call handling system, wherein said parsing means parses said arrangement of commands into said application segments as a function of said user preferences.

22. The computer program product of claim 14, further comprising:
means for providing said parsing means with information regarding functions each said component is capable of performing, wherein said parsing means parses said arrangement of commands into said application segments as a function of said component function information.

23. The computer program product of claim 22, further comprising:
means for determining if functions of said call handling system application are unavailable through utilizing said components.

24. The computer program product of claim 23, further comprising:
means for informing a user that functions of said call handling system application are unavailable.

25. The computer program product of claim 23, further comprising:
means for determining if said unavailable functions may be emulated.

26. The computer program product of claim 23, further comprising:
means for providing said parsing means with information regarding configuration options of ones of said components.

27. The computer program product of claim 26, further comprising:
means for determining if ones of said components may be reconfigured to make available said functions determined to be unavailable.

28. A method for developing a user definable application including at least two application portions using a high level instruction set having a plurality of instructions representing operations performable by said application, wherein each application portion is operable on a different device of a plurality of interconnected discrete devices, said method comprising the steps of:
selecting ones of said plurality of instructions;
identifying at least one common variable to be utilized by a plurality of said application portions;
specifying said selected instructions' interaction so as to define said application, said specified interaction including reference to said at lease one common variable; and
apportioning said selected ones of said instructions so as to identify particular selected instructions with a particular device of said plurality of interconnected devices suitable for performing an operation associated with said apportioned instruction.

29. The method of claim 28, further comprising the step of:
adapting instructions of said apportioned instructions specifically for use with said particular device.

30. The method of claim 28, wherein said specifying step is accomplished at least in part utilizing a graphical user interface including graphical icons representing said instructions wherein said graphical icons are manipulable by a user to create a program flow path interconnected with at least one arrow.

31. The method of claim 28, further comprising the step of:
providing a user preference regarding operation of ones of said devices, said apportioning step utilizing said user preference when apportioning said instructions.

32. The method of claim 28, further comprising the step of:
providing device operation information, said apportioning step utilizing said device operation information when apportioning said instructions.

33. The method of claim 32, further comprising the step of:
determining if operations of said application are accomplishable by said devices.

34. The method of claim 33, further comprising the step of:
informing a user of said operations not determined to be accomplishable.

35. The method of claim 33, further comprising the step of:
determining if operations not determined to be accomplishable may be emulated.

36. The method of claim 28, further comprising the step of:
providing configuration option information of ones of said devices, said apportioning step utilizing said configuration option information when apportioning said instructions.

37. The method of claim 36, further comprising the steps of:
determining if operations of said application are accomplishable by said devices;
determining if ones of said devices may be reconfigured to accomplish said operations not determined to be accomplishable.

38. A system for generating a call flow script operable across a plurality of interconnected discrete telephony related devices, at least two of the devices comprise at least one controller to execute call flow script code, said system comprising:
a predefined set of code constructs defining call flow functions operable on said telephony related devices, wherein first ones of said code constructs define functions utilizing a plurality of said interconnected telephony related devices and second ones of said code constructs define functions utilizing a single one of said interconnected telephony related devices, and wherein ones of said code constructs are inter-relatable to define said call flow script;
a plurality of hardware modules defining features of ones of said telephony related devices; and a parser providing script segments as a function of said features defined in said hardware modules appropriate for ones of the telephony related devices from said interrelated code constructs, wherein said parser divides portions of said first ones of said code constructs among said plurality of interconnected telephony related devices to realize said function utilizing said plurality of interconnected telephony related devices.

39. The system of claim 38, further comprising:

a graphical user interface, wherein ones of said code constructs are represented as graphical icons which may be interconnected by a user to graphically represent said call flow script.

40. The system of claim 38, further comprising:

system wide user preference information, wherein said parser provides said script segments at least in part through reference to said preference information.

41. The system of claim 40, wherein said preference information comprises information selected from the group consisting of:

a preferred device to perform a particular said function; and a desired global attribute.

42. The system of claim 38, wherein ones of said hardware modules include configuration information with respect to an associated telephony related device.

43. The system of claim 42, wherein said configuration information comprises information selected from the group consisting of:

identification of hardware components coupled to the associated telephony related device;

selection of a particular optional configuration of the associated telephony related device; and user selected preferences of the associated telephony related device.

44. The system of claim 38, further comprising:

a plurality of compilers corresponding to said plurality of telephony related devices, wherein a particular one of said compilers is associated with a particular one of said telephony related devices.

45. The system of claim 44, wherein said compilers are integral with said hardware modules.

46. The system of claim 38, further comprising:

a plurality of device interface protocols, wherein a particular one of said interface protocols defines an appropriate interface between a system generating said call flow script and a particular one of said telephony related devices.

47. The system of claim 46, wherein said interface protocols are integral with said hardware modules.

* * * * *